(12) United States Patent
Sieverding et al.

(10) Patent No.: US 7,195,047 B2
(45) Date of Patent: Mar. 27, 2007

(54) TIRE MANUFACTURING MODULE AND METHOD OF MANUFACTURING TIRES

(75) Inventors: Mark Anthony Sieverding, Uniontown, OH (US); Jean-Claude Girard, Copley, OH (US); William Dudley Currie, Stow, OH (US); David Alan Henthorne, Copley, OH (US); Dennis Alan Lundell, Stow, OH (US)

(73) Assignee: The Goodyear Tire and Rubber Company, Akron, OH (US)

( * ) Notice: Subject to any disclaimer, the term of this patent is extended or adjusted under 35 U.S.C. 154(b) by 416 days.

(21) Appl. No.: 10/733,778

(22) Filed: Dec. 11, 2003

(65) Prior Publication Data

US 2005/0126684 A1 Jun. 16, 2005

(51) Int. Cl.
*B29D 30/10* (2006.01)

(52) U.S. Cl. .................. 156/396; 156/397; 425/38

(58) Field of Classification Search ............ 156/111, 156/396, 130.5, 406.2; 425/28.1, 41
See application file for complete search history.

(56) References Cited

U.S. PATENT DOCUMENTS

| | | | | |
|---|---|---|---|---|
| 1,552,987 A | * | 9/1925 | Harsel | 156/111 |
| 1,566,500 A | * | 12/1925 | Northrup | 264/403 |
| 1,818,955 A | | 8/1931 | Maas | |
| 2,319,643 A | | 5/1943 | Sternad et al. | 159/106 |
| 3,389,032 A | | 6/1968 | Black et al. | 156/111 |
| 4,699,578 A | * | 10/1987 | Sumner et al. | 425/33 |
| 5,354,404 A | | 10/1994 | Benjamin | 156/362 |
| 5,411,626 A | | 5/1995 | Coretta et al. | 156/396 |
| 5,554,242 A | | 9/1996 | Brown et al. | 156/111 |
| 6,908,523 B2 | * | 6/2005 | Caretta et al. | 156/111 |
| 2002/0015746 A1 | * | 2/2002 | Mitamura et al. | 425/50 |
| 2002/0153083 A1 | * | 10/2002 | Takagi | 156/121 |

FOREIGN PATENT DOCUMENTS

| | | |
|---|---|---|
| EP | 0105048 | 4/1984 |
| EP | 0776756 | 6/1997 |
| EP | 1090729 | 4/2001 |
| EP | 1295708 | 3/2003 |
| EP | 1568475 | 8/2005 |

* cited by examiner

*Primary Examiner*—Geoffrey L. Knable
(74) *Attorney, Agent, or Firm*—Richard B. O'Planick; David L. King

(57) ABSTRACT

A module for manufacturing a cured tire from a plurality of tire components is disclosed. The module has a plurality of component appliers located at spaced locations along a predetermined path, and a mobile tire building trolley for movement along the predetermined path and two detachable tire building drums for mounting on the movable trolley. A tire curing station has one tire mold for curing the assembled tire components while mounted on one of the detachable tire building drums. The tire is cured as the other detachable tire building drum on the mobile tire building trolley is having tire components applied. One or more of the plurality of component appliers includes a means for forming the tire component at the location of the applier. The applied components include a liner, a pair of bead cores, a ply, a pair of sidewalls, a pair of chafers, and one or more belt layers and a tread. Optionally the applied components may also include an apex, wedges, overlays, underlays, gum strips, and elastomeric inserts. The module has a means for transferring the detachable tire building drums to the tire mold and further has a means for extracting the cured tire while mounted on a tire building drum from the mold. The tire curing station includes an induction curing means.

17 Claims, 15 Drawing Sheets

TIRE MANUFACTURING MODULE AND METHOD OF MANUFACTURING TIRES

CROSS-REFERENCE TO RELATED APPLICATIONS

This application relates to the following U.S. patent applications entitled: "A Method and Apparatus for forming an Annular Elastomeric Tire Component", U.S. Ser. No. 10/291,279, filed on Nov. 8, 2002; "An Improved Method and Apparatus for Manufacturing Carcass Plies For a Tire", U.S. Ser. No. 10/365,374, filed on Feb. 11, 2003; "Radially Expansible Tire Assembly Drum and Method For Forming Tires", Ser. No. 10/388,773, filed Mar. 14, 2003; "Method and Apparatus For Tread Belt Assemblies", filed on May 20, 2003; and "A Method For Curing Tires and a Self-Locking Tire Mold", U.S. Ser. No. 10/417,849, filed Apr. 17, 2003; "Method for Manufacturing Tires on a Flexible Manufacturing System, U.S. Ser. No. 10/449,468, filed May 30, 2003.

FIELD OF THE INVENTION

The present invention relates to automated tire manufacturing machines and more particular to methods and apparatus for simultaneously assembling a purality of tires on a plurality of tire building drums moving along a predetermined path with workstations disposed along the predetermined path and a tire curing station incorporated into the assembly machines wherein a tire is produced from raw components completely assembled and cured.

BACKGROUND OF THE INVENTION

It is known that in making vehicle tires, for example for automobiles, that manufacture of a so-called carcass is first achieved by successively assembling several different components.

In other words, the different carcass types included in a production range can be distinguished from one another depending on the presence thereon of the various accessory components and/or the typology of the accessory components themselves.

By way of example, when carcasses for tubeless tires are to be produced, that is tires that in use do not require the presence of an inner tube, the main components can be considered to include a so-called "inner liner" that is a layer of elastomeric air-impervious material, a carcass ply, a pair of annular metal elements, commonly referred to as bead cores, around which the opposite ends of the carcass ply are folded, as well as a pair of sidewalls made of elastomeric material, extending over the carcass ply at laterally opposite positions. The accessory components may in turn comprise of one or more additional carcass plies, one or more reinforcing bands for overlying the carcass ply or plies at the areas turned up around the bead cores, chafer strips, and others.

As disclosed in U.S. Pat. No. 5,554,242, two stage tire building with a first stage tire building drum in combination with a second stage tire building drum is well known and established in the art with the building drums being both in line and offset from each other. It is further known to have two-stage tire building with a single drum swinging between the first stage position and second stage position where a band builder is in line with the first stage building drum. For this system, individual breaker application and single piece tread rubber are applied at the second stage while components such as apex, chafers and shoulder wedges are applied at the first stage. The above components are made in separate operations and stored for use as needed in the two-stage building process.

While the two-stage building process in its separate stages accommodated servers for the various components, it presented the problems of requiring a large work area for the two separate positions and the need to coordinate the separate functions as well as bringing all of the components together at the proper stations. As a result, the components were often stored and became subject to aging, sometimes losing their tack, for example, during the handling of the individually applied components. Moving the tire subassemblies from one stage to another has been a highly labor intensive operation even with the use of mechanical servers to assist operators in placing the components on the tire on the first and second stage drums. As a result, the operation was costly.

U.S. Pat. No. 5,354,404 discloses a system for assembling green tires with a two-stage process where the assembly is automatic and requires a small amount of floor space. While this system, has overcome some floor space problems, its output is still limited.

It has been known in the prior art, as disclosed in U.S. Pat. No. 2,319,643, to manufacture tires on a line with a plurality of building drums that are chucked up at each station.

Also, as disclosed in U.S. Pat. No. 1,818,955, tires can be manufactured on a line with a plurality of building drums "arranged in a train or series and a connecting means is provided for translating the cores from one device to the next." The connectivity between the tire cores (building drums) leads to the inability to change the machine to accommodate various sized tire constructions. U.S. Pat. No. 3,389,032 also discloses a system using a large number of building drums which are interconnected.

Further, as disclosed in U.S. Pat. No. 5,354,404, there is illustrated another system for manufacturing tires on a line with a plurality of building drums "arranged in a train or series and a connecting means is provided for translating the cores from one device to the next." The connectivity between the tire building cores leads to the inability to change the machine to accommodate various sized tire constructions.

In modern production processes, the assembling of the different components is carried out in automated plants including a plurality of assembling drums moved following a precise working sequence in accordance with the manufacturing process to be executed. For example, as disclosed in U.S. Pat. No. 5,411,626, these plants can consist of a plurality of workstations disposed consecutively in side by side relation, each of which lends itself to carry out the application of a predetermined component onto the assembling drums that in turn are brought in front of it.

EPO 0105048 discloses a tire assembly means employing a conveyor to transport a plurality of tire building drums to a plurality of applicator stations wherein various components are applied to the tire building drums at the various applicator stations in order to fabricate a tire when the tire building drums have made a complete transversal of the conveyor, wherein the tire building drums are maintained in an angled relationship with respect to the conveyor and the applicator stations.

In particular there are primary workstations intended for application of the main components, which are always active, irrespective of the carcass type being produced. Alternated with the various primary workstations, there are one or more auxiliary workstations intended for application of accessory components, if required. The activation or deactivation state of these auxiliary workstations stations depends on the carcass type.

The problem with these prior art manufacturing systems is that the location and position of the building drums was not precise enough to ensure that the tires being constructed were of adequate uniformity for the requirements of present day high performance tires. That is, while the tire building drums moving along the assembly path were stopped at a stop position at each work position, there is no teaching or suggestion of how the position of the tire building drum was positioned at a precise position. Further, it appears that the power to operate each building drum was carried aboard each drum. This would suggest that each drum is more complicated and expensive to produce.

It is well known that the components of most pneumatic tire constructions must be assembled in a way, which promotes good tire uniformity in order to provide proper tire performance. For example, a tread which "snakes" as it goes around the tire circumference will cause wobbling as the tire is operated. For example, a carcass ply which is lopsided (longer cords on one side of the tire than the other side) can cause a variety of tire non-uniformity problems including static imbalance and radial force variations. For example, a tire which is not meridionally symmetric (e.g., tread not centered between beads) can cause a variety of tire non-uniformity problems including couple imbalance, lateral force variations, and conicity. Therefore, in order to meet typical tire performance requirements, the tire industry generally expends considerable effort in producing tires with good uniformity. Tire uniformity is generally considered to mean tire dimensions and mass distributions which are uniform and symmetric radially, laterally, circumferentially, and meridionally, thereby producing acceptable results for measurements of tire uniformity including static and dynamic balance, and also including radial force variation, lateral force variation, and tangential force variation as measured on tire uniformity machines which run the tire under load on a road wheel.

Although certain degrees of tire non-uniformity can be corrected in post-assembly manufacturing (e.g., by grinding), and/or in use (e.g., applying balance weights to the rim of a tire/wheel assembly), it is preferable (and generally more efficient) to build-in tire uniformity as much as possible. Typical tire building machines comprise a tire build drum around which the tire components are wrapped in successive layers including, for example, an inner liner, one or more carcass plies, optional sidewall stiffeners and bead area inserts (e.g., apex), sidewalls and bead wire rings (beads). After this layering, the carcass ply ends are wrapped around the beads, the tires are blown up into a toroidal shape, and the tread/belt package is applied. Typically the tire build drum is in a fixed location on the plant floor, and the various layers of components are applied manually or automatically using tooling registered to reference points on the fixed drum in order to ensure component placement with the desired degree of precision. The tooling is generally fixed relative to the tire building drum, for example a guide wheel on an arm extending from the same frame (machine base) which supports the tire building drum.

The prior art, as discussed herein still has problems of enabling the building of tires with complicated construction, such as runflat tires, to be built on a single manufacturing line that is capable of being easily changed to accommodate different constructions sizes.

According to the one prior art invention there is disclosed in patent EPO 1295701 a method for simultaneously building a plurality of tire carcasses. The method comprises the tire building steps of establishing a sequence of at least three and up to ten workstations; advancing at least three disconnected cylindrically shaped tire building drums along a working axis extending through the at least three workstations; and applying one or more tire components to the tire building drums at each of the workstations. Then the resulting flat built green tire carcass is removed at the last of the workstations. Finally, the tire building drum is advanced from the last workstation after the flat built green carcass has been removed to the first workstation. Thereafter, the belt and tread package is disposed about the cylindrical or flat built green tire carcass, expanding the tire carcass into a tread and belt to form a green tire.

According to that invention, the tire building drums were disconnected from each other and independently advanced along the linear working axis extending between the workstations. Each of the disconnected tire building drums were individually advanced along the working axis so that the axis of rotation of each tire building drums remains aligned with the linear working axis.

According to that invention, the plurality of disconnected tire building drums can be simultaneously advanced along a working axis with individual, self propelled devices to which the tire building drums are mounted from one workstation to another. The tire building drums are advanced along the working axis so that an axis of rotation through the building drum is maintained at a constant predetermined height and location and in parallel alignment with the working axis.

According to that invention, an intake server is located at each of the workstations for operating the tire building drums. The intake servers were coupled to the building drums while maintaining the axis of rotation through the building drums at the constant predetermined height and location and in parallel alignment with the working axis. The intake server at each of the workstations move from their normally retracted position outward across the working axis into a position to couple to that tire build drum. Then the building drums were uncoupled from the intake servers after the tire component(s) had been applied to the building drums. Next, the intake server at each of the workstations were retracted to their normally retracted position, prior to the now uncoupled tire building drum advancing to the next workstation.

According to the invention, the step of applying one or more tire components to the tire building drums at each of the workstations included applying the tire components to the tire building drums while maintaining the axis of rotation through the building drums at the constant predetermined height and location and in parallel alignment with the working axis. This was accomplished by providing one or more application drums at each of the workstations for applying the tire component(s) to the building drums.

The application drums are moved from their normal retracted position away from the working axis to a location where the tire components can be applied to the building drums while maintaining the axis of rotation through the building drums at the constant predetermined height and location and in parallel alignment with the working axis. Then the application drums are retracted at each of the workstations to their normally retracted position, prior to advancing the tire building drum to the next workstation.

A primary limitation of the above-described prior art method of automated tire assembly is believed to be the applying of the components for the carcass assembly on a flat building drum and then inflating said drum to a toroidal shape prior to applying the belt tread assembly.

Another primary limitation is the application of the tread belt assembly to the toroidially shaped carcass means. The green tire assembly must be inflated and further expanded to fit the internal surfaces of the mold cavity.

In essence the entire automated assembly resulted in a most conventional green tire carcass and belt assembly to result with all the inherent deficiencies in the manufacture flat tire building methods.

The present invention proposes a novel way to build a tire in a shape closely simulating a finished product while achieving high levels of automation and precision part placement.

Another objective of the present invention is to achieve the ability to change tire sizes in the line to permit a variety of sizes to be built simultaneously without disrupting the line for size changeovers. This capability enables tires to be built in an automated way in lot sizes as small as one tire.

Another objective of the present invention is to provide a cure station so that the tire is completed from start to finish from raw components to a cured tire within the manufacturing module.

SUMMARY OF THE INVENTION

A module for manufacturing a cured tire from a plurality of tire components is disclosed. The module has a plurality of component appliers located at spaced locations along a predetermined path, and a mobile tire building trolley for movement along the predetermined path and two detachable tire building drums for mounting on the movable trolley. A tire curing station has one tire mold for curing the assembled tire components while mounted on one of the detachable tire building drums. The tire is cured as the other detachable tire building drum on the mobile tire building trolley is having tire components applied.

One or more of the plurality of component appliers includes a means for forming the tire component at the location of the applier. The applied components may include a liner, a pair of bead cores, a ply, a pair of sidewalls, a pair of chafers, and one or more belt layers and a tread. Also, the applied components may include gum strips, wedges, overlays, underlays, apex and runflat or elastomeric inserts.

The module has a means for transferring the detachable tire building drums to the tire mold and further has a means for extracting the cured tire while mounted on a tire building drum from the mold. The tire curing station includes an induction curing means. In one embodiment of the module, one or more of the component appliers applies strips of elastomer on the rotating tire building drum as the trolley moves along the predetermined path. The advancement along the path provides a lateral movement of the strips along the toroidal shape of the tire building drum to form the applied component. The plurality of component appliers includes one or more extruders or gear pump to form or smear the components as strips. Alternatively, the trolley and rotating building drum can remain stationary as one or more appliers move laterally around or about the circumferential surface of the toroidally shaped building drum. In one embodiment of the invention the module has two mobile tire building trolleys for movement along the predetermined path and has three detachable tire building drums for mounting on the movable trolleys. The tire curing station has a pick-up and transfer device for moving the detachable drums and one tire curing mold for receiving and curing the tire as the trolleys are having components applied along the predetermined path. In this embodiment the detachable tire building drums are transferable to and from the first trolley, second trolley, and the tire curing station. In this module one tire is being cured as two tires are being assembled. In one of the modules, according to the present invention, a plurality of component appliers are located at spaced locations along a predetermined path and a tire curing station having one tire curing mold for curing the tire and a means for curing located between one or more component appliers along that predetermined path.

The above described module for manufacturing and curing a tire permit the tire to be manufactured using a unique method of manufacturing. The method of manufacturing and curing a tire has the steps of applying the tire components at spaced locations along a predetermined path onto detachable tire building drums on one or more mobile tire building trolleys movable along the predetermined path. The method further includes placing the assembled tire components while mounted on one of the detachable building drums into a tire curing mold located along the tire building predetermined path. The method further includes the step of curing the tire in the mold as one or more trolleys with detachable building drums has tire components being applied.

It is preferable that the step of applying the tire components includes the step of forming one or more of the tire components at the locations where the component is applied. It is further contemplated that the step of forming includes the step of extruding strips of elastomeric rubber. The above method permits the tire to be formed, applied, and cured in a small module. This module permits the manufacture of tires in very small lot sizes.

In order to change tire sizes or to build another tire construction the module has software pre-programmed to the specific tire construction. A simple changing of the mold permits the manufacture of different tires of different sizes and styles. Additionally, different tire building drums are applied to the trolley to permit the manufacture of different sizes of tires. The above-manufacturing module permits small production lots to be produced in a very efficient manner.

DEFINITIONS

The following terms may be used throughout the descriptions presented herein and should generally be given the following meaning unless contradicted or elaborated upon by other descriptions set forth herein.

"Apex" (also "Bead Apex") refers to an elastomeric filler located radially above the bead core and between or adjacent the plies and the turnup ply ends if the tire employs ply turnup ends.

"Axial" and "axially" refers to directions that are on or are parallel to the tire's axis of rotation.

"Axial" refers to a direction parallel to the axis of rotation of the tire.

"Bead" refers to that part of the tire comprising an annular substantially inextensible tensile member, typically comprising a cable of steel filaments encased in rubber material.

"Belt structure" or "reinforcement belts" or "belt package" refers to at least two annular layers or plies of parallel cords, woven or unwoven, underlying the tread, unanchored to the bead, and having both left and right cord angles in the range from 18 to 30 degrees relative to the equatorial plane of the tire.

"Carcass" refers to the tire structure apart from the belt structure and the tread, but including the sidewall rubber, beads, plies, and, in the case of EMT or runflat tires, the wedge inserts sidewall reinforcements.

"Casing" refers to the carcass, belt structure, beads, and all other components of the tire excepting the tread and undertread.

"Chafer" refers to reinforcing material (rubber alone, or fabric and rubber) around the bead in the rim flange area to prevent chafing of the tire by the rim parts.

"Chipper" refers to a narrow band of fabric or steel cords located in the bead area whose function is to reinforce the bead area and stabilize the radially inwardmost part of the sidewall.

"Circumferential" refers to circular lines or directions extending along the perimeter of the surface of the annular tread perpendicular to the axial direction, and can also refer to the direction of sets of adjacent circular curves whose radii define the axial curvature of the tread, as viewed in cross section.

"Cord" refers to one of the reinforcement strands, including fibers or metal or fabric, with which the plies and belts are reinforced.

"Crown" or "tire crown" refers to the tread, tread shoulders and the immediately adjacent portions of the sidewalls.

"EMT tire" refers to Extended Mobility Technology and EMT tire refers to a tire which is a "runflat", which refers to a tire that is designed provide at least limited operational service under conditions when the tire has little to no inflation pressure.

"Equatorial plane" refers to the plane perpendicular to the tire's axis of rotation and passing through the center of its tread, or midway between the tire's beads.

"Gauge" refers generally to a measurement, and often to a thickness dimension.

"Inner liner" refers to the layer or layers of elastomer or other material that form the inside surface of a tubeless tire and that contain the inflating gas or fluid within the tire. Halobutyl, which is highly impermeable to air.

"Insert" refers to the crescent-shaped or wedge-shaped reinforcement typically used to reinforce the sidewalls of runflat-type tires; it also refers to the elastomeric non-crescent-shaped insert that underlies the tread; it is also called a "wedge insert."

"Lateral" refers to a direction parallel to the axial direction.

"Meridional profile" refers to a tire profile cut along a plane that includes the tire axis. "Ply" refers to a cord-reinforced carcass-reinforcing member (layer) of rubber-coated radially deployed or otherwise parallel cords.

"Pneumatic tire" refers to a laminated mechanical device of generally toroidal shape (usually an open-torus) having two beads, two sidewalls and a tread and made of rubber, chemicals, fabric and steel or other materials.

"Shoulder" refers to the upper portion of sidewall just below the tread edge.

"Sidewall" refers to that portion of a tire between the tread and the bead.

"Tire axis" refers to the tire's axis of rotation when the tire is mounted to a wheel rim and is rotating.

"Tread cap" refers to the tread and the underlying material into which the tread pattern is molded.

"Turn-up end" refers to a portion of a carcass ply that turns upward (i.e., radially outward) from the beads about which the ply is wrapped.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
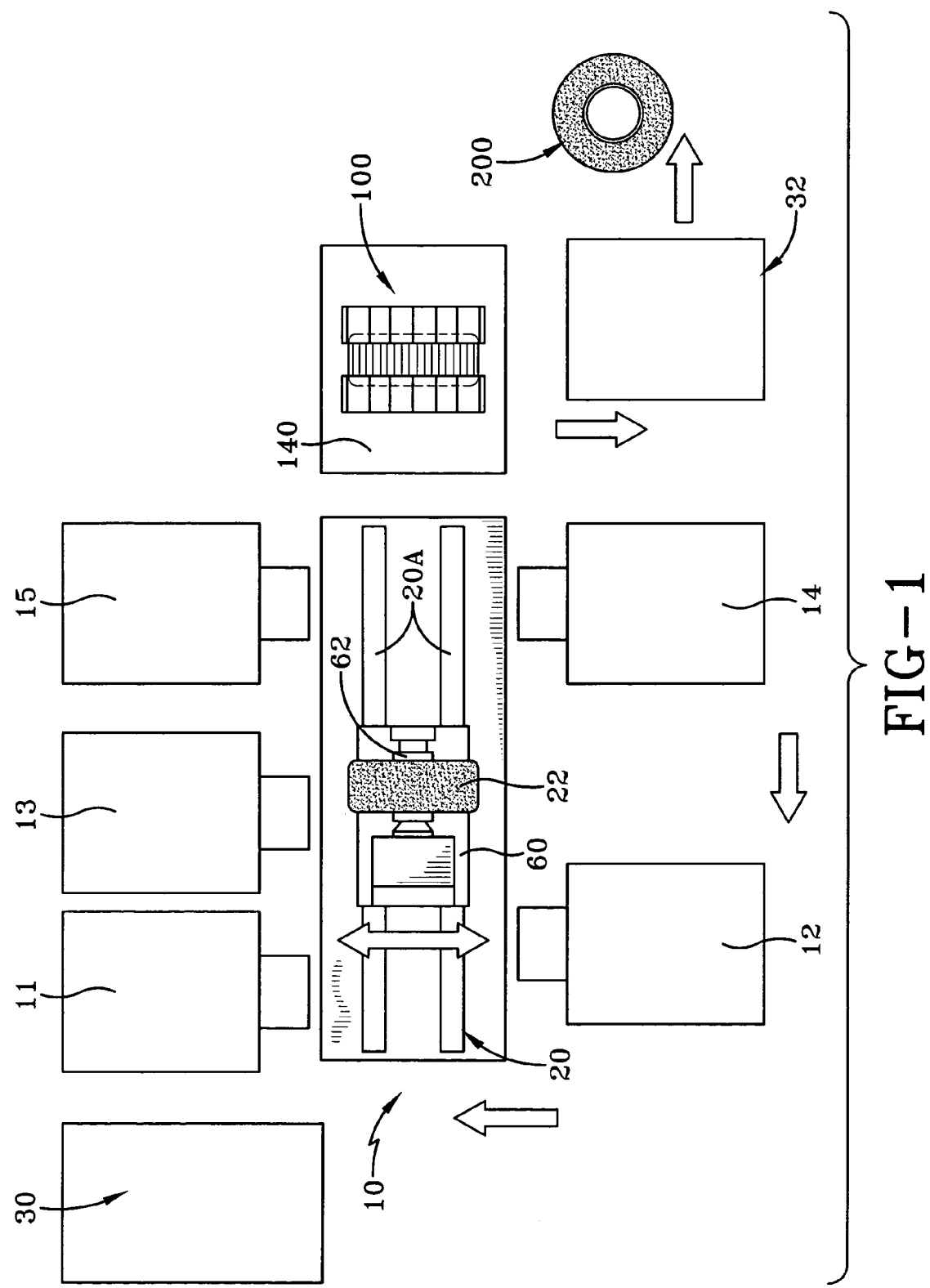
Figure 2:
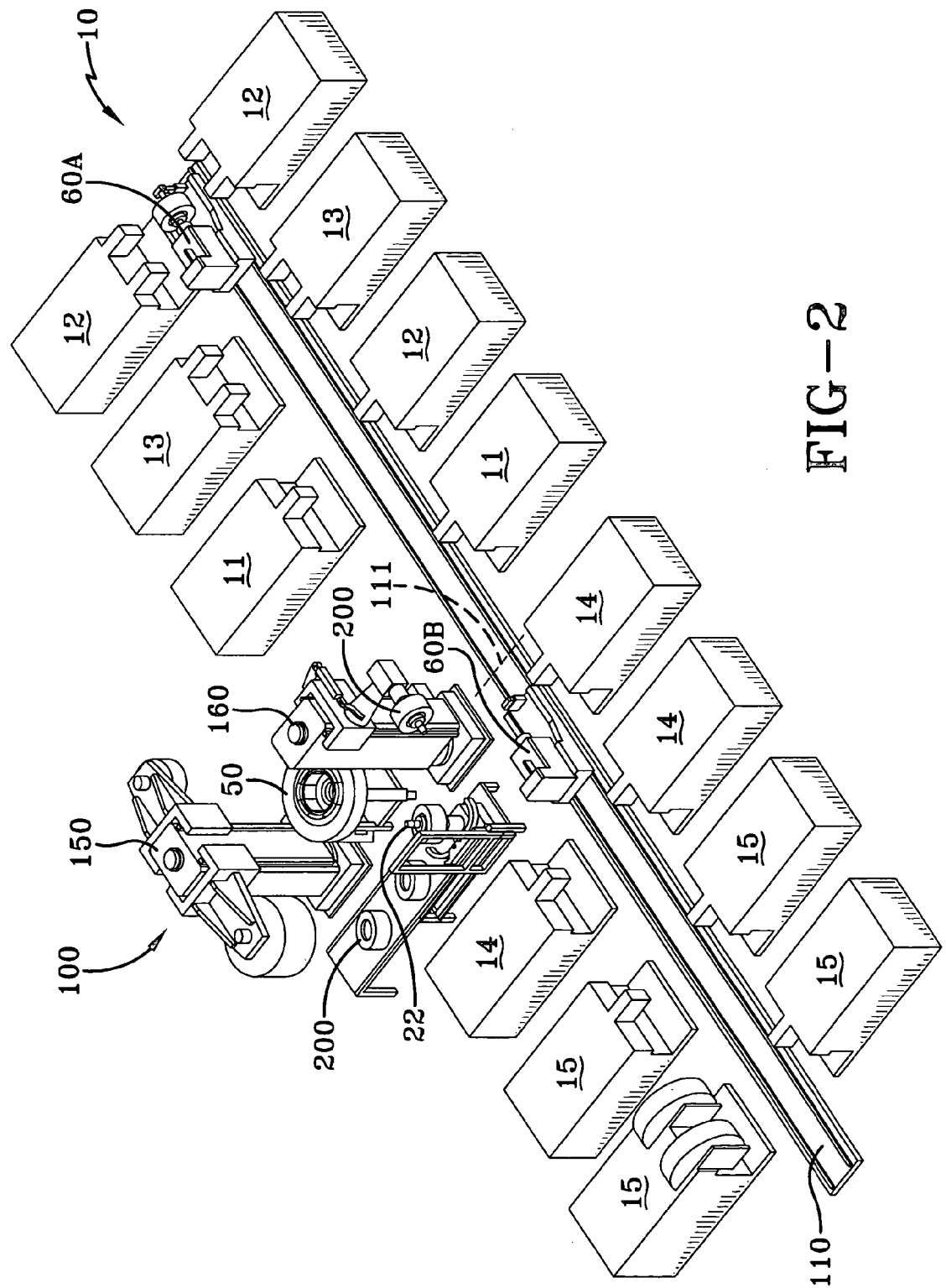
Figure 2A:
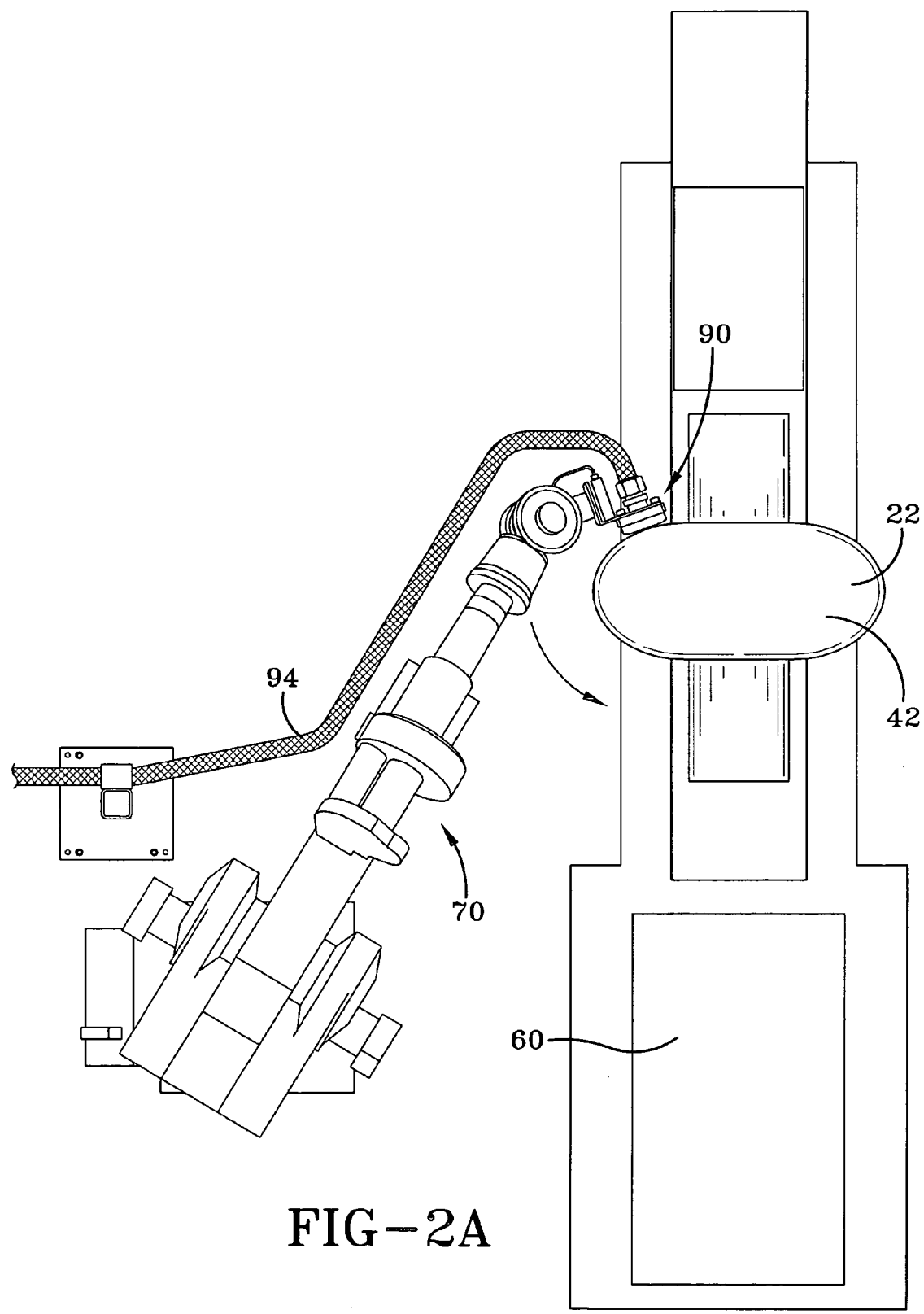
Figure 2B:
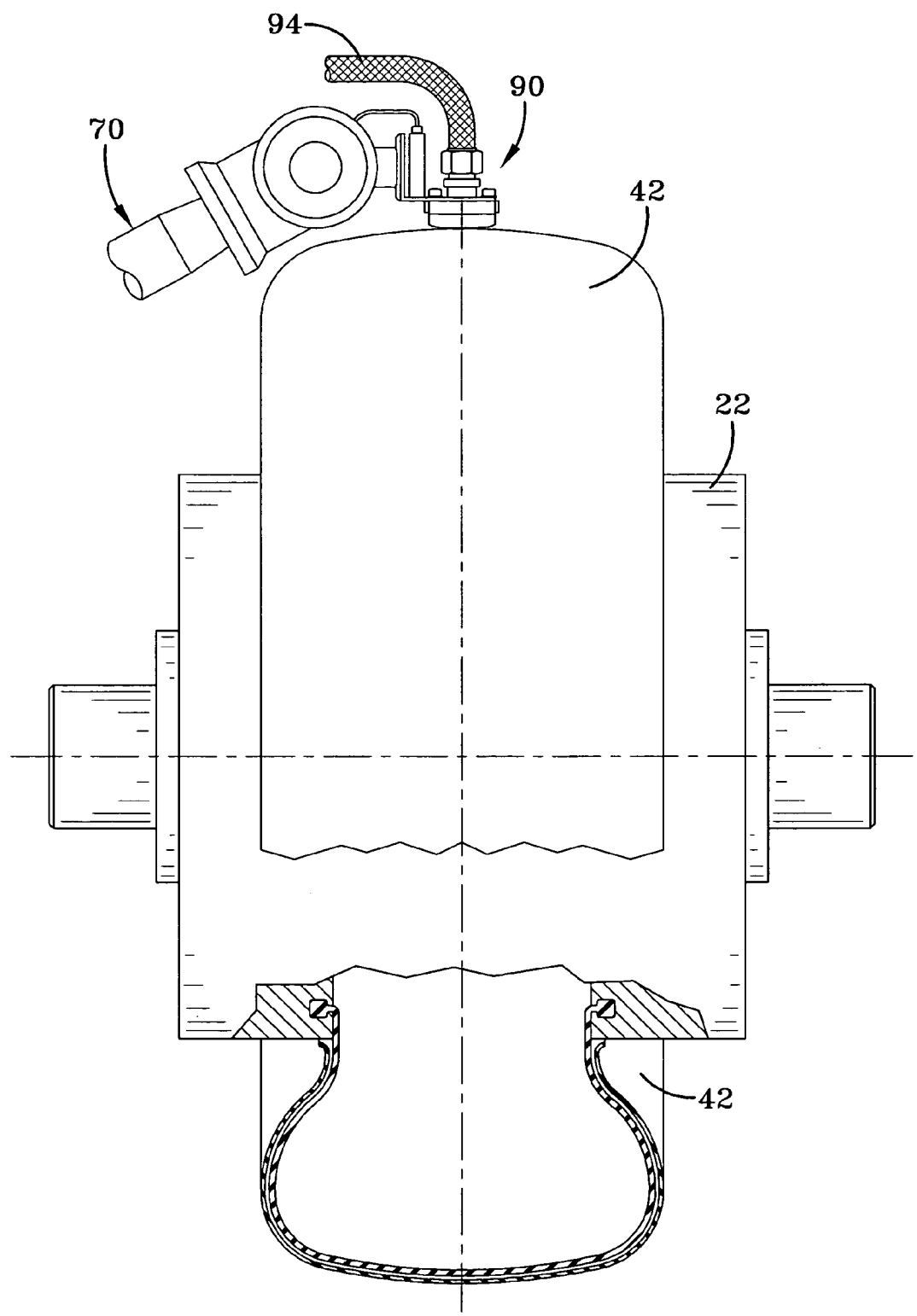

The structure, operation, and advantages of the present preferred embodiment of the invention will become further apparent upon consideration of the following description taken in conjunction with the accompanying drawings, wherein:

FIG. 1 is a schematic view of an automated tire manufacturing module, according to a first embodiment of the invention;

FIG. 2 is a perspective view of an automated tire manufacturing module according to a second embodiment of the present invention;

FIG. 2A is a top view of an exemplary initial workstation of the automated tire manufacturing module showing a tire building drum coupled to an applier station, according to the invention;

FIG. 2B is a plan view of the application of a tire component at the exemplary initial workstation.

Figure 3A:
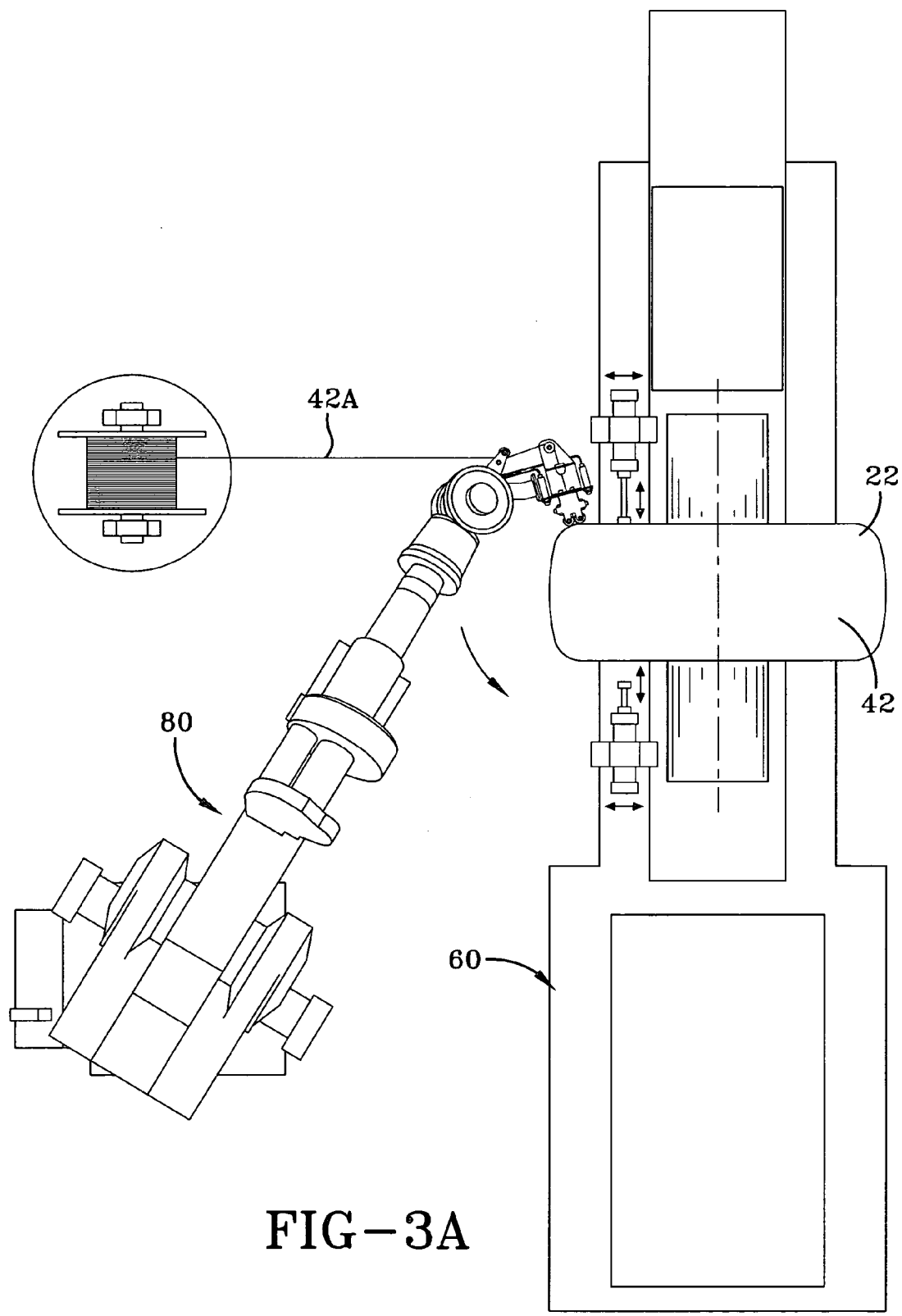
Figure 3B:
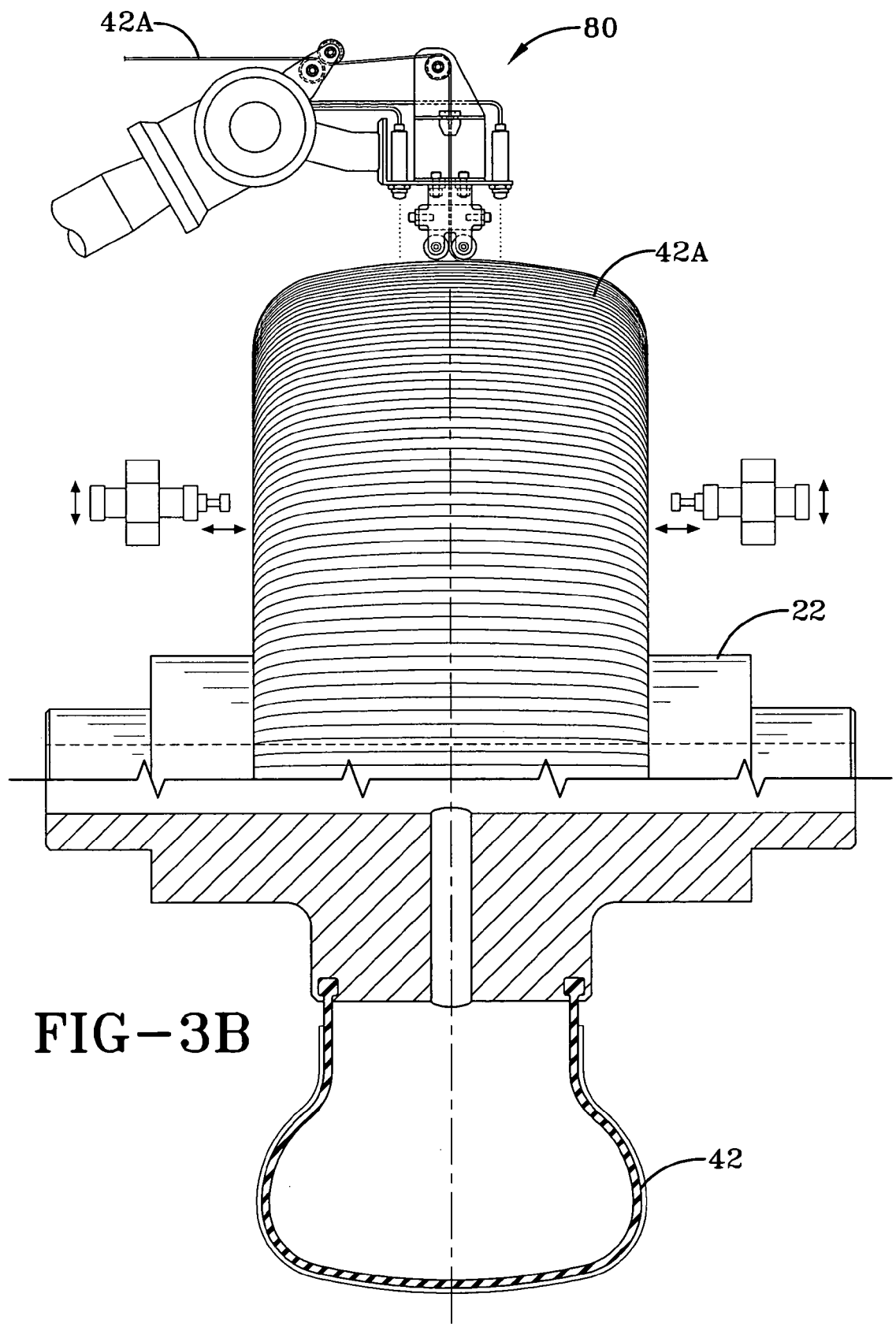
Figure 3C:
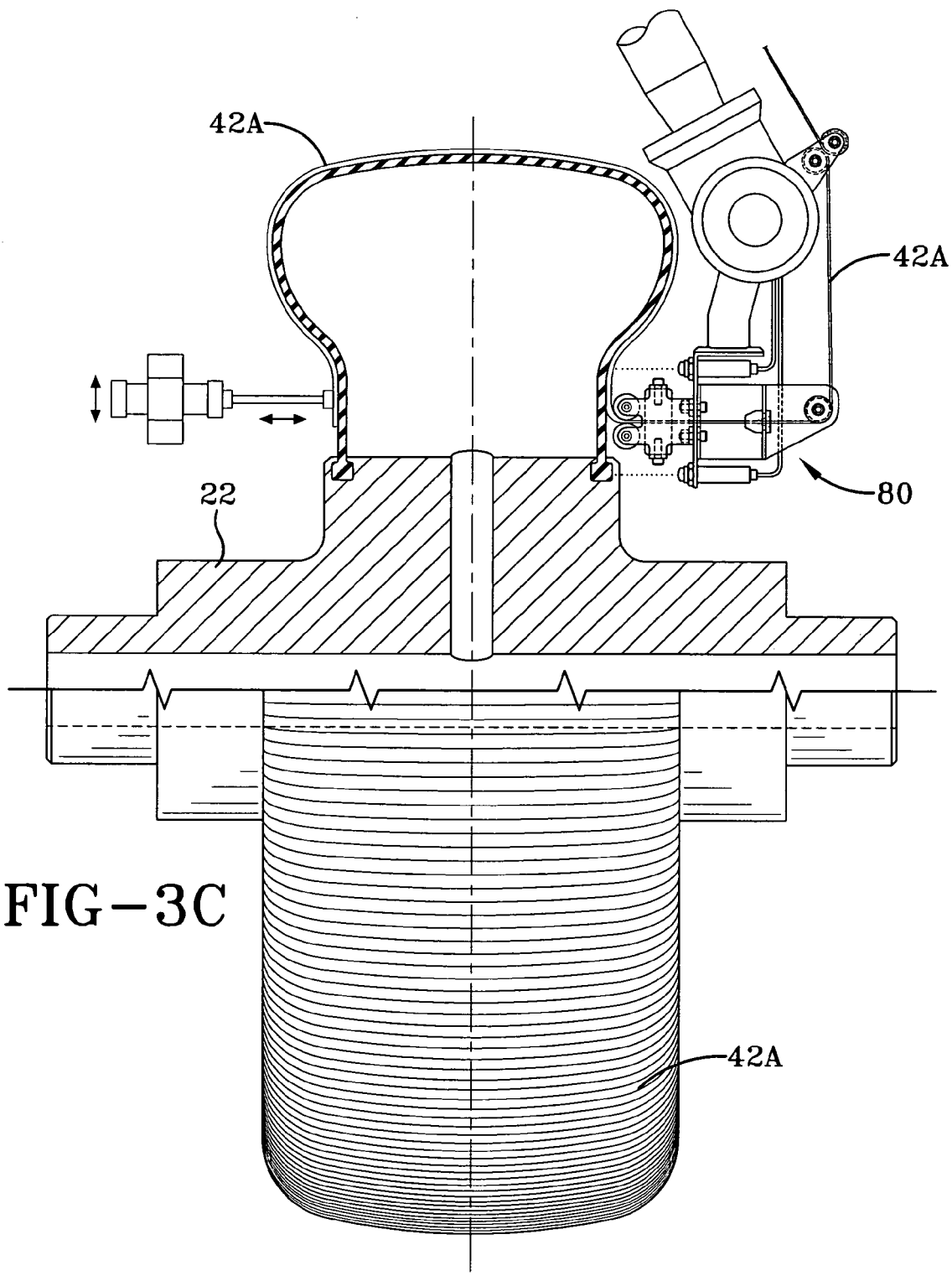

FIGS. 3A, 3B, 3C are views of an intermediate exemplary workstation according to the invention.

Figure 5:
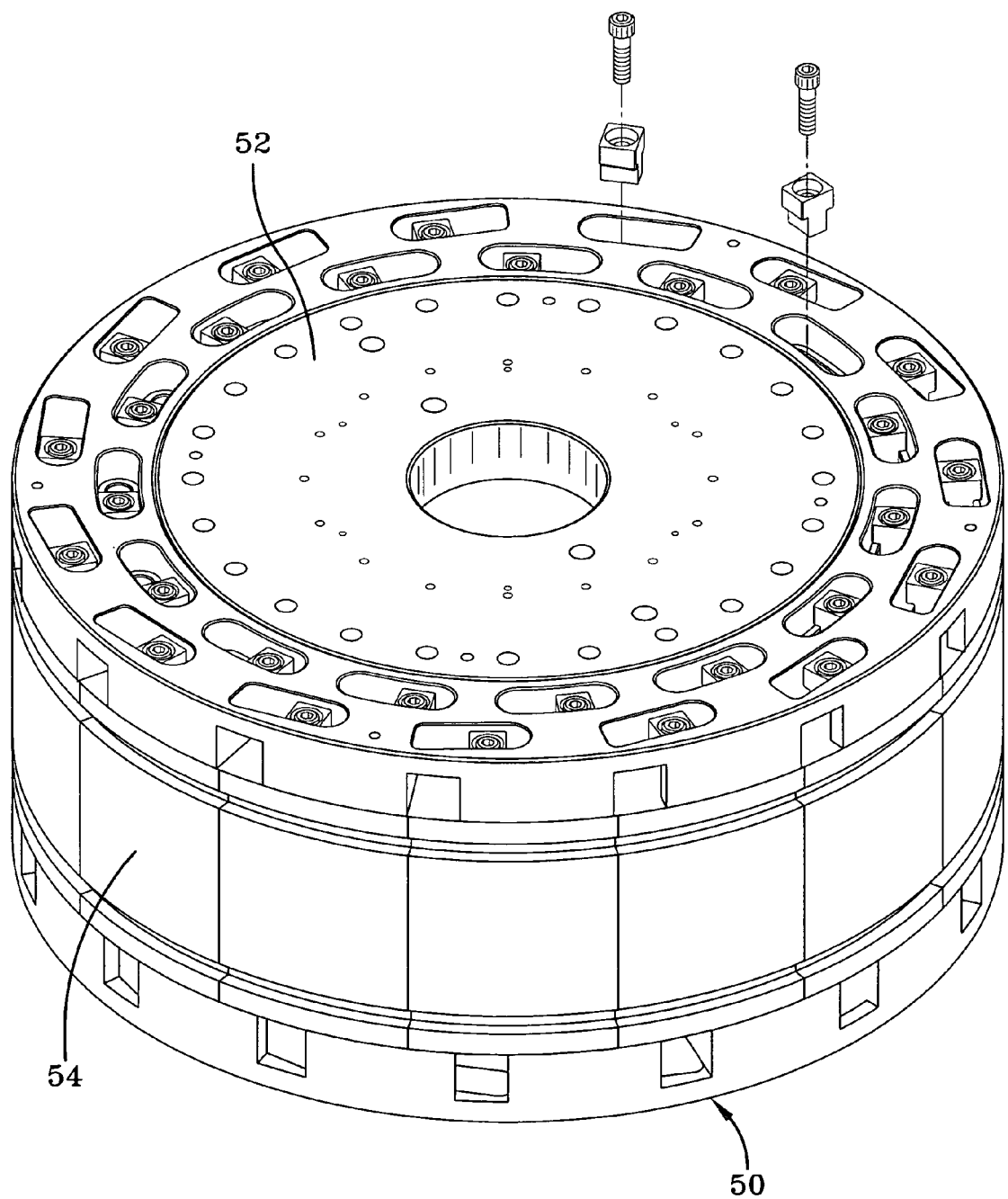
Figure 6:
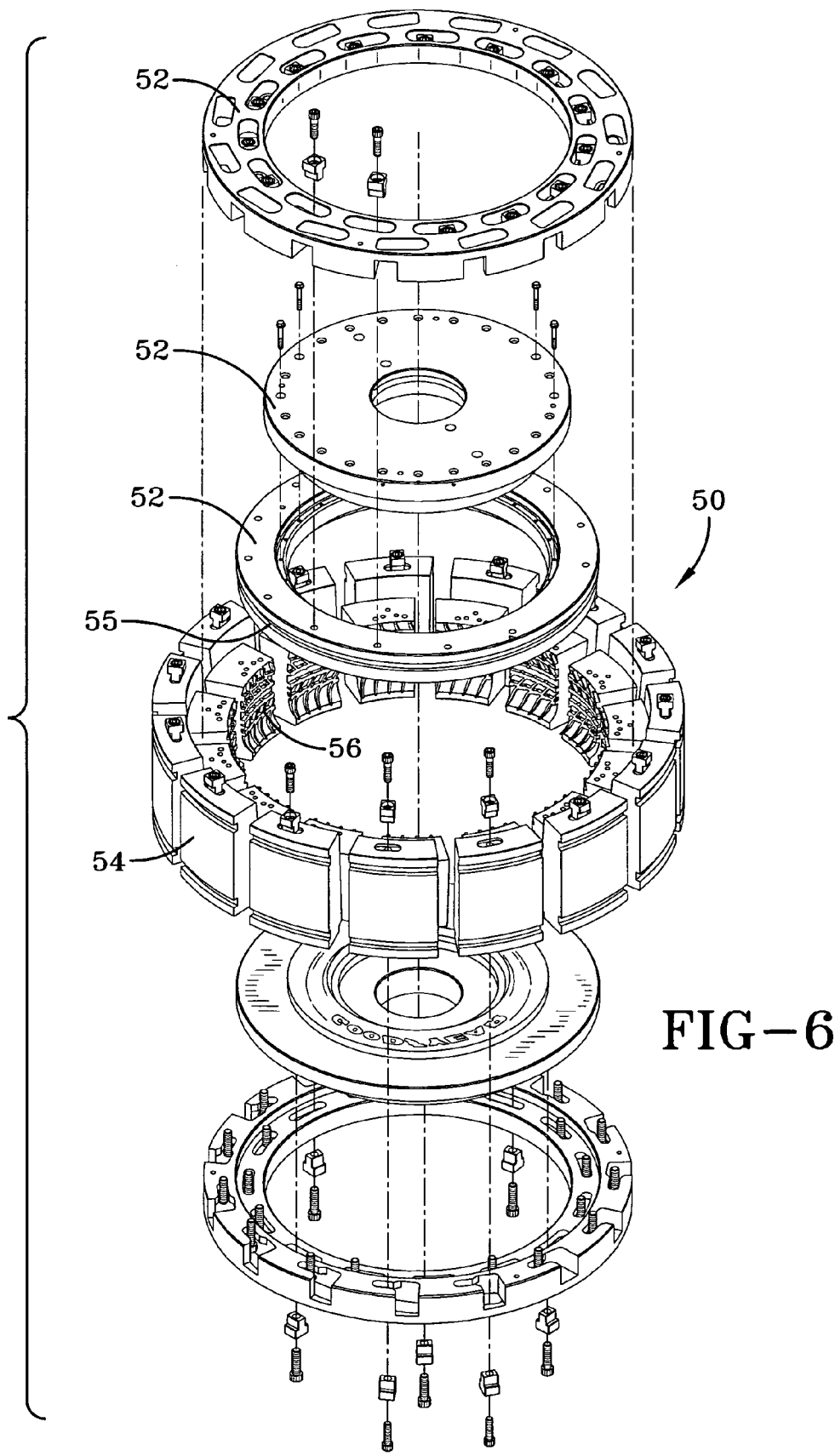
Figure 7:
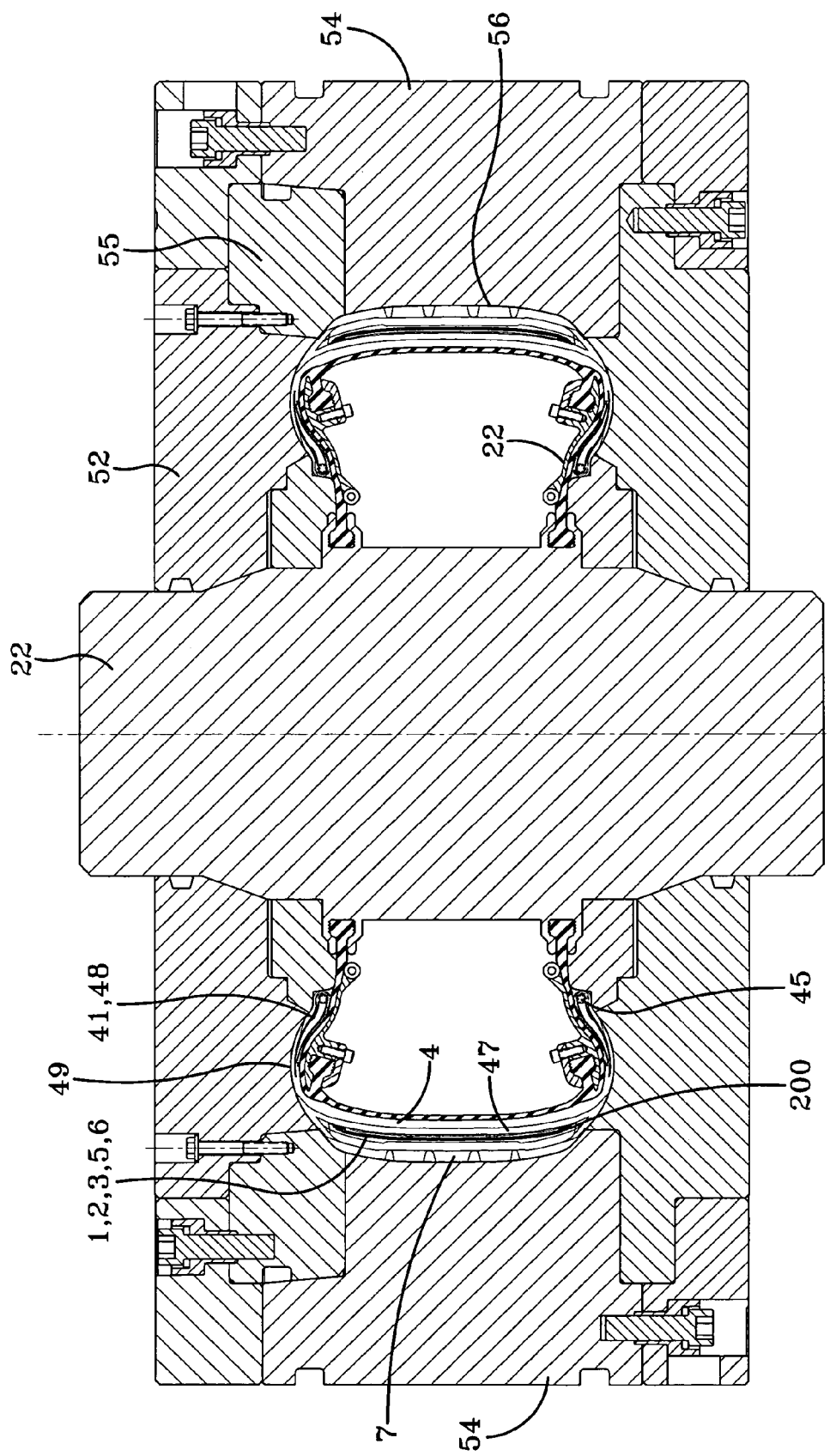

FIGS. 4A–4E are views of the detachable tire building drum according to the present invention;

FIGS. 5 and 6 are a perspective view and an exploded view of the self-locking tire mold;

FIG. 7 is a cross-sectional view of the carcass drum assembly and carcass shown installed into the mold and ready to be cured.

DETAILED DESCRIPTION OF THE INVENTION

With reference to FIGS. 1 and 2 schematic views of an automated tire manufacturing module 10 according to the present invention are illustrated. This system or module 10 provides for the complete manufacture of pneumatic tires and provides up to two simultaneously operating tire building stations and one tire curing station in one module. This module 10 forms the tire carcass subassembly 4 and the tire belt tread subassembly 3. As shown in FIG. 7, these two subassemblies 3, 4 after being assembled on a detachable building drum 22 and inserted while on the building drum into a tire curing mold 50 after their assembly is completed. When at the tire curing mold, the mold 50 will then be closed and heated at a mold curing station 100 which permits the tires 200 to be cured or otherwise vulcanized and removed from the mold 50 and the building drum 22.

As shown the FIGS. 1 and 2 at the initial building of a tire there is a mobile tire building trolleys 60, 60A with a specific detachable tire building drum assembly 22 designed to permit the fabrication of the tire carcass 4 onto the toroidally expanded building drum assembly 22 so when the tire carcass 4 is formed it is in the toroidal shape very close to the finished tire dimensions as it is assembled. The detachable building drums 22 are mounted on transporter devices called mobile tire building trolleys 60, 60A, 60B. These trolleys 60, 60A, 60B accept the building drum 22 and will traverse along a predetermined path or line 20, 110 as shown in FIGS. 1 and 2. The trolleys 60, 60A, 60B provide a means 62 for rotating the tire building drum 22 at each workstation as the specific tire component is being applied. The workstations and the tire trolleys 60, 60A, 60B have the software programmed into each of the workstations and trolleys and are coordinated by supervisory software such that the proper component is provided to the tire building drum 22 at the precise time and location desired.

As illustrated in the exemplary schematic of FIG. 1 an initial workstation 11 applies a chafer component 41 to the tire building drum 22 and an innerliner 42.

An exemplary workstation 11 for applying a component is illustrated in FIGS. 2A and 2B. FIG. 2A shows a top view of the workstation. FIG. 2A shows that workstation applying a tire innerliner 42. As illustrated, the robotic mechanisms 70 smear or apply extruded rubber while hot or apply the liner 42 in strips directly onto the tire building drum 22. As noted, if a chafer component 41 has been previously applied using a similar technique, the liner 42 will be applied directly over the chafer 41 as required by the tire building specification. If an optional runflat insert component is required or additional elastomeric components are applied, additional workstations can be provided to provide these features. A more complete detailed description of the apparatus for smearing components onto a tire building drum is described in the "Method and Apparatus for Forming an Annular Elastomeric Tire Component, U.S. Ser. No. 10/291, 271, filed on Nov. 8, 2002, which is incorporated herein by reference in its entirety. These initial workstations apply the components onto a toroidally shaped building drum 22 that is transported along the predetermined path or line 20 as shown. Each tire building drum 22 is positioned at an axis fundamentally perpendicular to the workstation and is transported directly in front of the workstation and stops at or moves to a precise location to permit the application of the tire components. While the elastomeric components are shown being applied and extruded directly onto and smeared onto the building drum 22 and other underlying carcass components using a smearing die 90 at the end of a supplier hose 94 connected to a computer controlled robot 70, it is possible to apply these components using more conventional elastomeric strip application means by providing necessary server mechanisms and by supplying the components in layers onto the building drum 22, each component being cut and fed to length. When the components are formed as strips the drum 22 and the trolleys 60, 60A, 60B can be moved along the path to permit that motion to be coupled with the rotation of the building drum 22 to form this component.

After the initial components have been applied to the tire building drum assembly 22, the assembly is then transferred to an intermediate workstation 12 wherein the carcass ply 44 and beads 45 are applied to the building drum 22. These may be applied using strips or laminate layers of ply 44 and preformed beads 45 or, alternatively, the ply 44 may be produced using a cord placement mechanism 80 as shown in FIGS. 3A, 3B and 3C. In using this mechanism, the ply cords 42A are placed precisely onto the building drum 22 overlaying a ply coat of rubber and the previously applied carcass components. The ply cord paths are positioned very precisely onto the tire building drum in a very fast and accurate manner as illustrated. Once the ply cords 42A are positioned, an additional elastomeric ply coat layer may be applied over the ply cords 42A and the annular bead cores 45 can then be positioned onto the carcass assembly 4.

The entire assembly 22 is then moved to the next building station or workstation 13 wherein wedges 47, additional chafers 48 and sidewall 49 components can be applied to the carcass subassembly 4 using either the smearing or strip application techniques previously discussed or by using elastomeric layers applied by more applier means, preferably by applying freshly formed elastomeric wound strips. After the sidewalls 49 are applied, final elastomeric components such as the belts 1, 2, overlays 6 and tread 7 are applied to the carcass assembly 4 on the toroidally shaped building drum 22 at exemplary workstations 14, 15. The entire building drum assembly 22 with carcass 4 and tread belt reinforcing structure 3 is then removed from the mobile trolley 60 at the cure station. As shown in FIG. 1, the trolley 60 then is loaded with an empty building drum 22 and traverses back into starting workstation 11 of the module 10 to return to the next tire build whereupon it will be routed for an additional pass through the system 10 to build a second tire carcass 4 and tread belt reinforcing structure 3.

While this entire process of building the carcass 4 and tread belt structure 3 is being accomplished a simultaneous curing of the uncured tire 200 is occurring.

With further reference to FIG. 1, the module 10, in conjunction with the trolley 60 mechanism, is programmed to build not only the carcass 4 but also a particular tread belt structure 3. At the belt workstation 15 the belt layers 1 and 2 are applied to the outer peripheral surface of the carcass assembly 4 on the detachable building drum 22, as illustrated. After the first wide belt 1 is applied and the second narrow belt 2 is applied, a gum strip 5 is applied to each edge of the first belt layer 1 at the workstation 15. If required, an optional overlay workstation 15 can be provided wherein overlays 6 having substantially 0° or very low angles in the circumferential direction are wound onto and overlaying the underlying belt structure 1, 2. Once these components 1, 2, 5 and 6 are laid onto the outer peripheral surface of the carcass 4, the tread 7 is applied over the underlying components as illustrated. Once the tread 7 is freshly extruded it is applied while still hot as either an annular strip or as a spirally wound plurality of strips to form an unvulcanized tread component 7, this completes the tread belt reinforcing structure assembly 3. At this final workstation 14 the building drum 22 is removed from the trolley 60 and the trolley 60 receives a new empty detachable building drum 22 and is moved laterally back along the predetermined path 20 on the rails 20A to repeat the process for the next tire building assembly, assuming that the same tire size or style is required. If a different size assembly is required, the building drum staging area 30 will be accessed and a specific building drum 22 will be provided by removing the initial building drum 22 and replacing it with a second building drum 22 of a different size as required.

Once the tread belt assembly 3 is completely formed, the entire uncured tire 200 on the detachable building drum 22 including the carcass 4 and tread belt reinforcing structure 3 freshly formed and preferably still hot mounted to it is removed from the trolley 60 and delivered to an open segmented mold 50 at location 140. As shown in FIGS. 5 and 6, a self-locking type mold is described in a "Method for Curing Tires In a Self-Locking Tire Mold", U.S. Ser. No. 10/417,849, filed Apr. 17, 2003, which is incorporated herein by reference in its entirety. This mold 50 is shown in perspective view has a top plate 52 which is removed and the segments 54 are radially expanded to accept drum 22 with the tread belt reinforcing structure 3 and carcass 4 mounted to it. Once inserted into the open mold 50 as illustrated in FIG. 7, the top plate 52 of the mold 50 is closed upon the tire building drum assembly 22 and the segments 54 are radially contracted inwardly compressing against the still warm tread 7 against the tread forming surface of the mold 56 of the mold 50 as shown in FIG. 7.

As shown in FIG. 7, the carcass 4 and tread belt structure 3 mounted on the building drum assembly 22 now removed from trolley 60 can be inserted into the mold 50 and the empty trolley 60 received an empty detachable building drum 22 and is moved back to an initial workstation 11 to receive the instructions for the next tire assembly.

With the top plate 52 of the mold 50 open, the entire building drum assembly 22 with the carcass 4 and tread belt assembly 3 mounted thereto can be inserted directly into the mold 50. This is made possible due to the fact that an upper portion 55 of the tread mold forming section of the mold is attached to the top plate 52. This permits the entire uncured tire 200 to be able to fit directly into the mold 50 with the carcass 4 and tread belt assembly 3 in place. Once inserted into the mold 50, the mold 50 can be closed and locked and the carcass subassembly 4 inflated by applying internal pressure to the building drum assembly 22 further pressing the tread 7 into the internal surfaces of the mold 50. Once this is accomplished the mold 50 can be heated and pressurized to curing mold temperatures and pressures and the mold 50 will then finish the overall vulcanization of the tire 200 encased into the mold 50. As the mold 50 finishes the heating curing cycle it is ready for mold opening and removal of the tire. At this point, the mold 50 is open, the mold segments 54 are radially expanded and the building drum core 22 with the tire mounted thereto is removed from the mold 50.

Figure 4A:
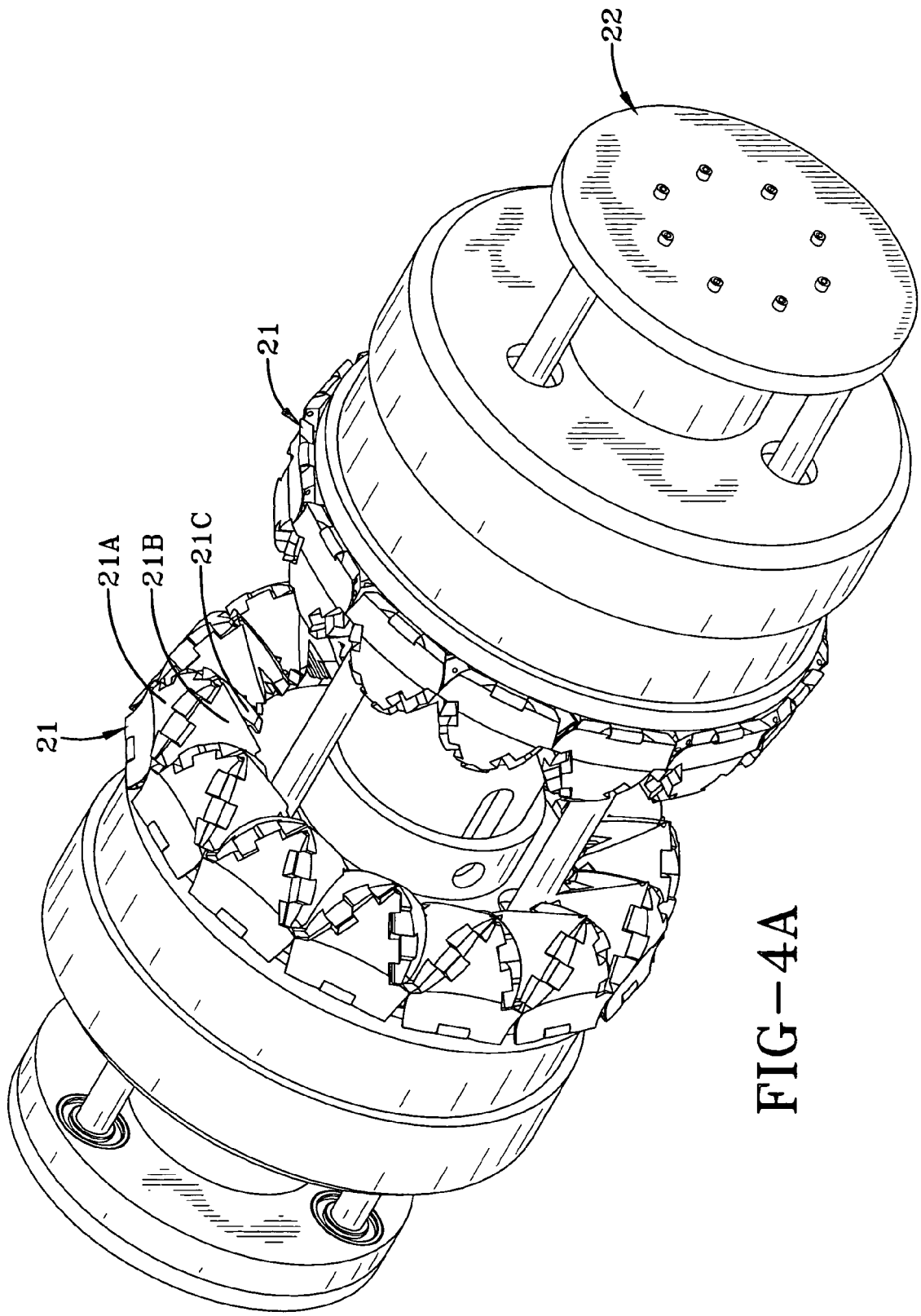
Figure 4B:
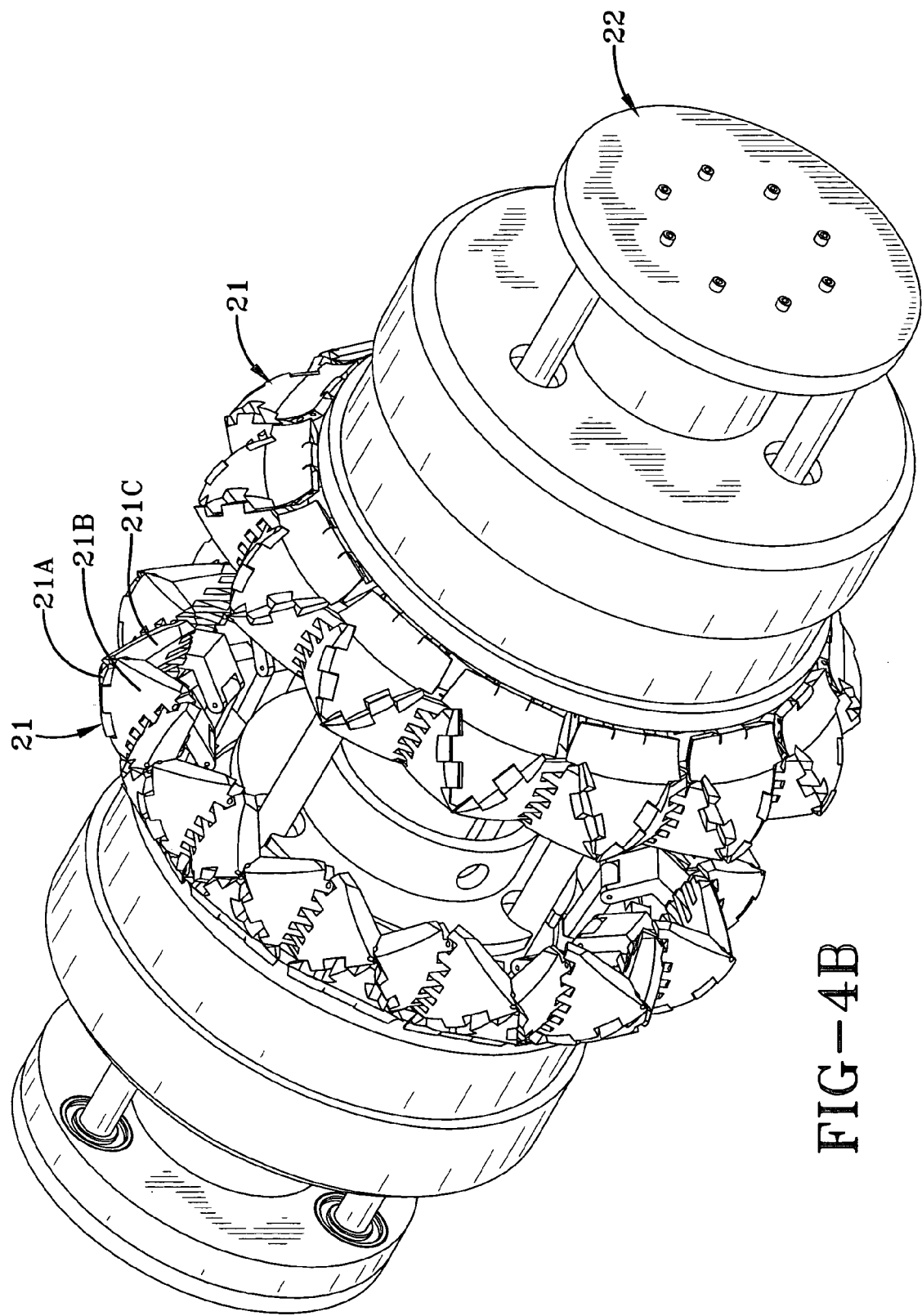
Figure 4C:
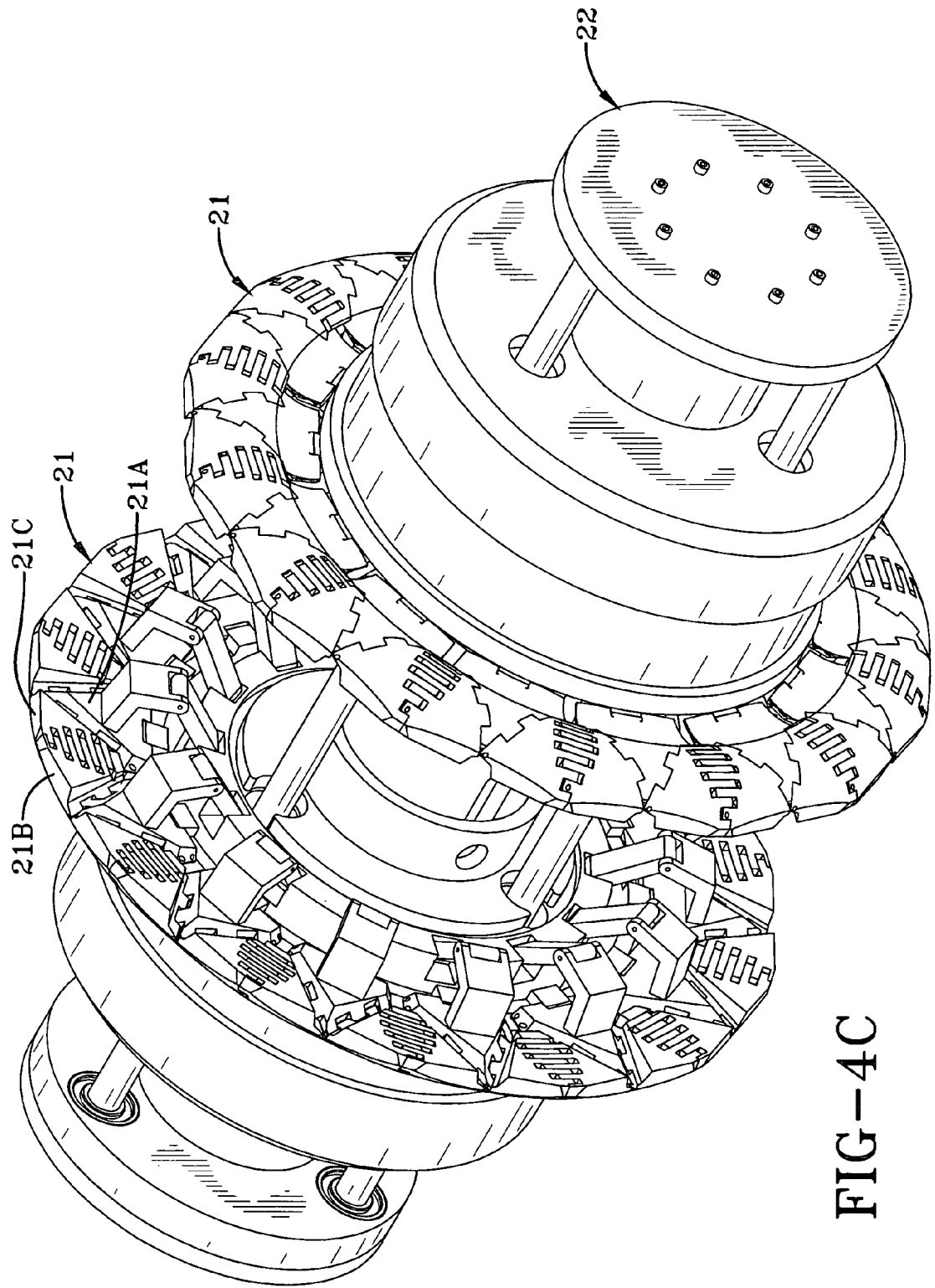
Figure 4D:
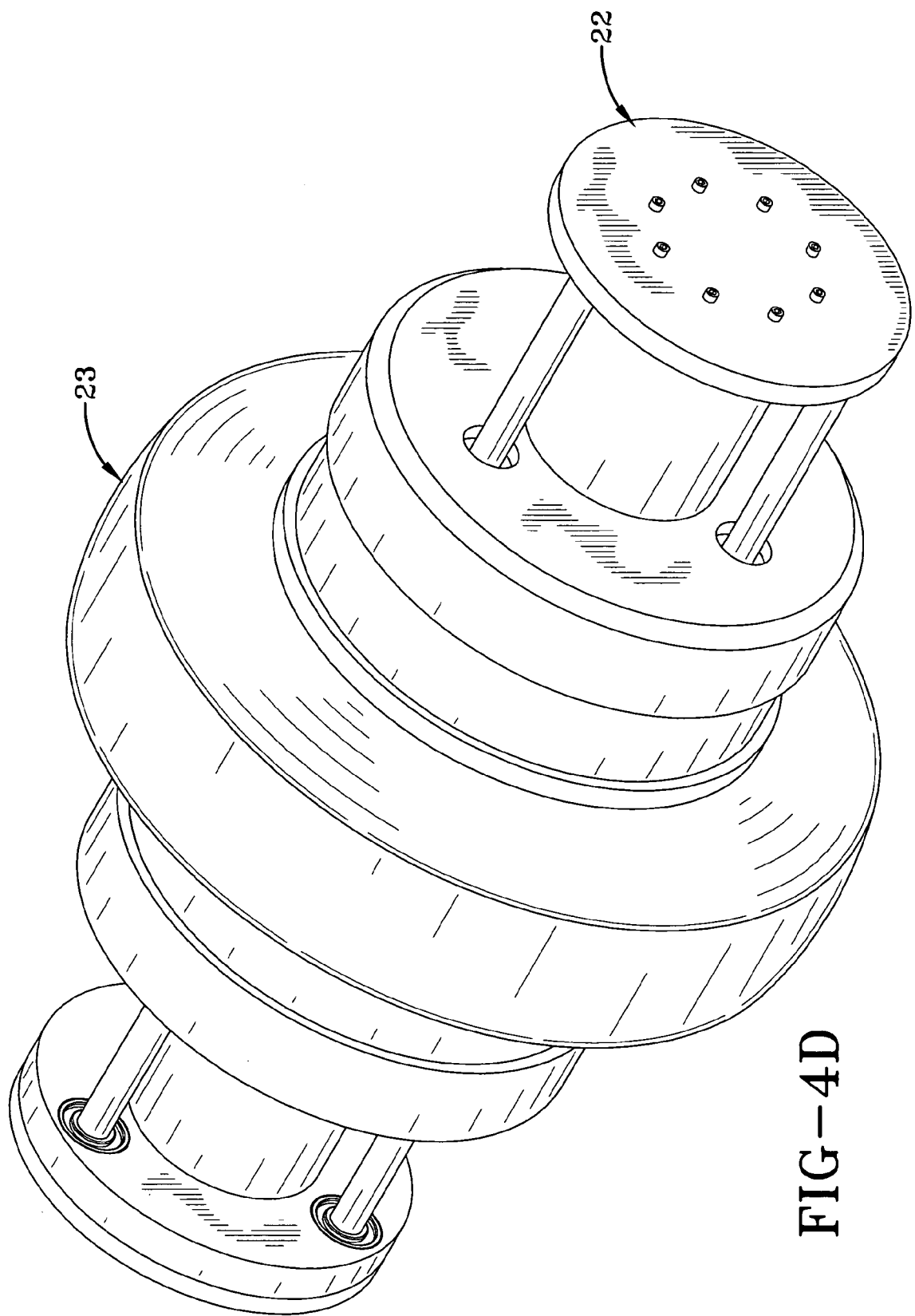
Figure 4E:
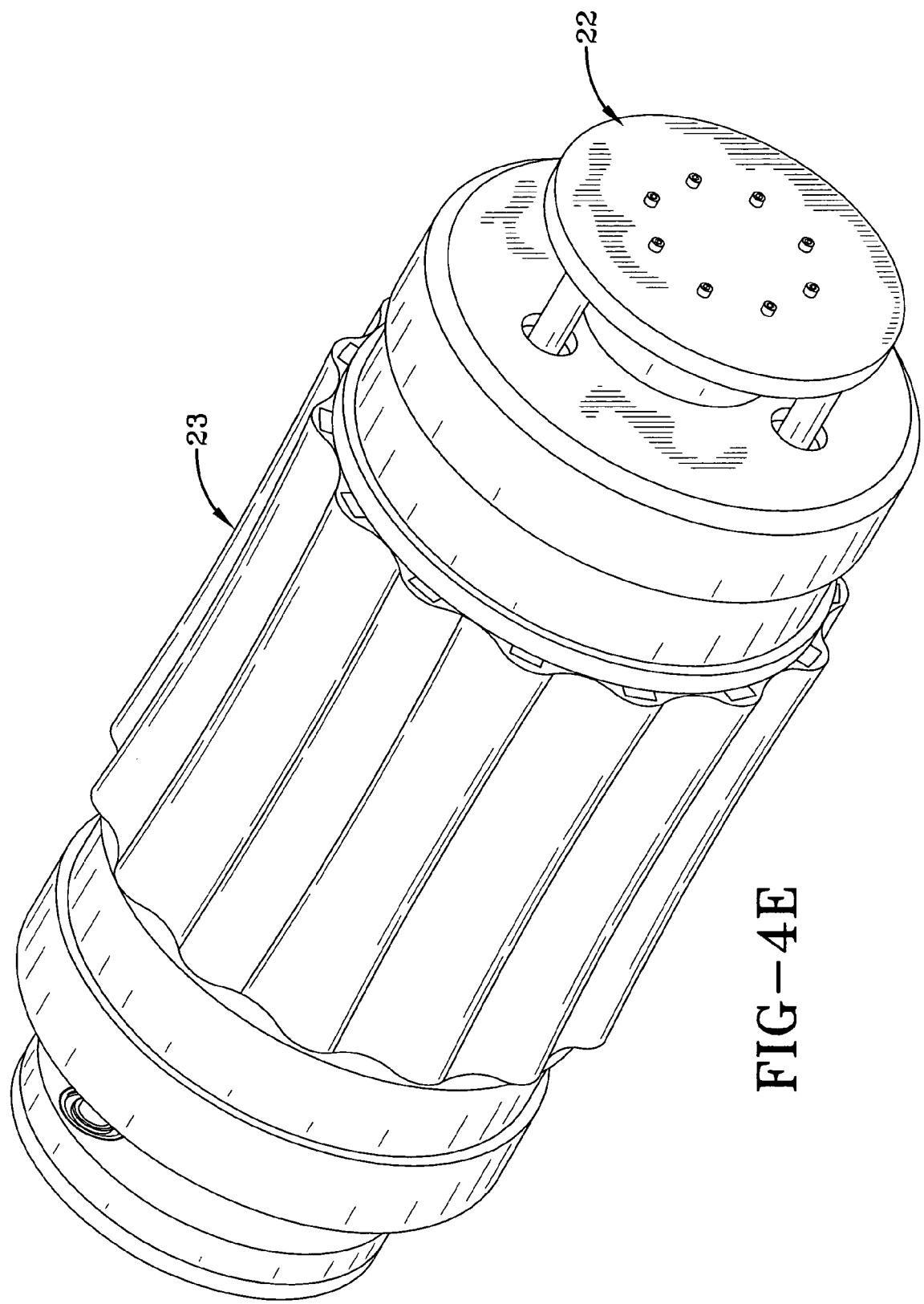

With reference to FIGS. 4A, 4B, 4C, 4D and 4E, for a better understanding of the invention it must be appreciated that the carcass building drum core 22 is radially expandable and collapsible. As illustrated in FIG. 4A internal mechanisms 21 can be folded radially inwardly as the building drum 22 is expanded axially outwardly. As the building drum 22 is moved axially inwardly at both ends, the sidewall support mechanisms shown as interlocking triangles 21A, 21B, 21C move radially outwardly until in a fully closed position these mechanisms 21A, 21B and 21C are almost fully radially extending as illustrated in FIG. 4C. The result is that during the tire building an elastomeric cover 23 which is also partially reinforced at least in the crown area is mounted over these sidewall supporting structures 21 as shown in FIG. 4D. This creates a generally rigid building surface upon which all the carcass components can be fabricated. The building drum 22 being portable, as previously discussed, can be removed from the trolley 60 in this radially expanded condition and then can be transferred directly into the mold 50 for the curing as previously described. Once this is completed, however, the tire 200 must be removed and as is illustrated in FIG. 4E this is done by simply expanding outwardly the axial ends which draws the sidewalls supports 21 down and the supporting elastomeric cover 23 can be radially lowered such that the tire 200 can be removed from the tire building drum assembly 22 at the tire separating workstation 32.

Once this is accomplished, the tire building drum 22 can go back to the trolley 60 for a second tire build, it will be picked up by a transfer means and placed on the trolley 60 or moved directly to a trolley mechanism 60 whereupon it will repeat the process for building a second tire. The tire building drum 22 is explained in greater detail in a patent application entitled "Radially Expansible Tire Assembly Drum and Method for Forming Tires", Ser. No. 10/388,773, filed Mar. 14, 2003, and the contents of which are incorporated herein by reference in their entirety.

The automated module 10 as shown in FIG. 1 permits the manufacture of tires in lot sizes as small as one tire to be produced while simultaneously producing other tire sizes at different workstations. The software package communicates to each workstation the amount of rubber, the shape or profile and the type of component required for that specific tire build. As the building drums 22 progress in front of the workstation the appropriate material at the appropriate location is applied, either to the carcass drum building assembly 22 or to the previously applied components. All these functions can be occurring simultaneously as a tire 200 is being cured. These components, once formed, create a complete tire carcass 4 and a complete tread belt reinforcing structure 3.

An advantage of the present invention over prior art invention is that that tread belt subassembly 3 and carcass 4 are inserted directly into a mold 50 while freshly formed and located on the tire building drum 22 whereupon the mold 50 is closed upon the tire assembly in such a preassembled fashion that it is cured directly into the mold 50. The unique self-locking mold 50 then is opened to permit the entire carcass 4 and tread belt 3 for that particular tire size to be inserted into the mold 50 while mounted on its building drum 22. The mold 50 is then closed and heated for a curing process which may be done by either conventional steam methods, induction curing with electromagnetic fields, or otherwise. Once the curing cycle is completed, the mold 50 is opened and the cured tire on building drum 22 is removed. This is all accomplished while another tire 200 is being continuously fabricated on the trolley 60 with a detachable building drum 22 at the various workstations of the system 10 along the predetermined path 20.

As noted and shown in FIG. 1, this permits lot sizes from very small production runs to be fabricated with great ease. It does require, however, that staging areas 30 provide multiple drums for building carcasses of various sizes that can be attached to the trolley 60. The building drum 22 staging area 30 provides a ready supply of building drum 22 for the tire manufacture. What this means is a day's production of tires can be scheduled wherein a variety of lot sizes and tire specifications can be built without any downtime for tire size changeovers. Conventional high production, high volume tire lines require significant amount of downtime to replace both the molds and to reset all the building specifications for the different components at the tire building stations. It is particularly true in conventional first and second stage tire building systems. The present invention provides that such changeovers can occur with no downtime. While the embodiment of FIGS. 1 and 2 shows the exemplary tire building manufacturing process or module 10 that would commonly be applied for passenger and light truck tires, as well as aircraft, medium truck, motorcycle and off-the-road tires, it must be appreciated that additional workstations can be provided and that these workstations can be used to add other components in the tire building manufacturing without jeopardizing the overall flexibility of tire building as previously discussed. It is understood that the additional components may be used or not used as the as the specific tire selected is being built. Often times, many tires require components that are optional in other tires and therefore the builds may be different. The present invention permits this tire assembly to handle such variations and that the progression of the components through the line provides a rapid tire building capability.

One of the interesting differences of the present invention compared to prior art tire manufacturing is that it contemplates applying the components while hot onto the building drums and that while these hot components are freshly being produced at the carcass building and tread belt assembly workstations, they are then directly placed into a mold while hot, the mold is closed while all the components maintain their own heat from being formed and then are routed directly. This has a tremendous advantage in that component materials can be provided that would otherwise bloom or cause a powdery substance called sulfur to leach out of the component prior to vulcanization. Historically, tires are made of strips and then stored. These strips set over a period of time and the material tends to bloom or have sulfur or other components leach out to the surface. This creates situations where the tires can have problems during manufacture due to the variations in freshness of the various components. The present invention ensures that the rubber materials are applied approximately as fresh as possible, preferably with no lap or butt splices. In other words they are still warm when they are placed in the mold. There has been no opportunity for contamination or deformation to occur due to subassembly storage and handling. This greatly improves the manufacturing quality of the finished product and ensures that the components will be properly place and properly mixed at the time they are applied. Furthermore, there are energy savings due to keeping materials hot instead of deliberately cooling for storage as in prior methods.

With reference to FIG. 2 a second embodiment of the present invention is shown wherein the tire manufacturing module 100 includes two trolleys 60 that traverse along a predetermined path 110. As illustrated, the trolleys 60A, 60B can have the carcass components applied as previously discussed on the tire building drum 22 at the various workstations 11 through 13 and then as the trolley 60A progresses toward the central location of the predetermined path 110 the building drum 22 can be picked up and transferred to a second trolley 60B. The trolley 60B then can move down the remainder of the line 110 stopping at the multiple workstations 14 through 15 applying belts 1, 2, overlay 6 and the tread 7 to finish the tread belt structure 3. The components can be applied on one or both sides of the trolleys 60A, 60B as it moves outward in one direction and as it returns other components can be applied until it reaches the central transfer location 111. Once the entire carcass 4 and tread belt assembly 3 are applied to the detachable building drum 22 the trolley 60B reaches a cure station 150 that has a transfer means 160 that can pick up the carcass 4 and tread belt 3 mounted to the detachable building drum 22 and transfer that directly into a mold 50. As the building drum 22 is being transferred, it pivots about its axis of rotation approximately 180° to the open segmented mold 50 wherein it is pivoted from a horizontal plane to a vertical plane and then moved into the mold whereupon the mold 50 closes upon the assembly and cures the tire 200. As this is occurring an empty building drum 22 is placed back onto the trolley 60A and it proceeds to continue building the next tire assembly. While this is occurring, the second trolley 60B is continuing to have components applied in a progression. In this embodiment, two trolleys 60A and 60B are employed and three building drums 22, one building drum 22 with an assembled tire 200 is cured as the other two trolleys 60A, 60B are receiving drums 22 and are applying components in a continuous process. This is analogous to a juggler juggling three balls. There is constant movement and constant activity occurring in the tire building process such that a continual flow product can be produced at this module 10.

When applying the components using elastomeric strips, the strips are applied to the rotated building drum as a freshly formed tape. One of the advantages of the present method of assembly is that the software is programmed such that movement along the predetermined path 20, 110 can progress incrementally such that as the tire building drum 22 is being rotated the strips are being applied uniformly across the building drum or the carcass crown. This ensures that the entire lateral movement of the trolleys 60, 60A, 60B enables the component appliers to simply apply the strips at a specific location as the trolley moves as shown in FIGS. 1 and 2. This incremental movement can be controlled precisely by the software and enables multiple layers of strips to be applied to change the thickness at any location along the predetermined path. This method of assembly is considered quite unique in tire building and heretofore has been unknown.

While the components are undoubtedly applied where formed creating a tremendous manufacturing advantage in terms of freshness, an additional advantage is that the component materials can be provided to each workstation in rather bulk form. The component material can be made without the use of processing aides such as anti-aging ingredients and curing accelerators needed to survive storage as no storage is needed, greatly reducing material cost. Furthermore, much of the component handling equipment commonly found in tire building can be eliminated. Therefore, inventory of intermediate components is reduced to a very low amount and in the case of the elastomer components the storage of these intermediate articles is virtually eliminated. This very compact reduced floor space tire building module greatly reduces the tonnage of raw material needed to be stored as components and eliminates such ancillary devices as storage racks and hand trucks, greatly reducing the manpower and maintenance required to support them.

What is claimed is:

1. A module for manufacturing a plurality of cured tires from a plurality of tire components, the module comprising:
   a plurality of tire building drums;
   a plurality of first workstations each configured to apply at least one of the tire components on each of said tire building drums;
   a plurality of second workstations each configured to apply at least another of the tire components on each of said tire building drums;
   a cure station including a tire mold for curing the tire components applied on each of said tire building drums to form a corresponding one of the cured tires, said cure station, said first workstations, and said second workstations arranged along a path with said cure station centrally located between said first workstations and said second workstations, and at least one of said first workstations disposed on opposite side of said path from at least another of said first workstations; and
   a first mobile tire building trolley configured to support each of said tire building drums in a detachable manner, said first mobile tire building trolley transporting each of said tire building drums along said path in proximity to said first workstations.

2. The module of claim 1 wherein said second workstations are disposed on opposite sides of said path.

3. The module of claim 2 further comprising
   a second mobile tire building trolley configured to support each of said tire building drums in a detachable manner, said second mobile tire building trolley transporting each of said tire building drums along said path in proximity to said second workstations.

4. The module of claim 3 further comprising:
means for transferring each of said tire building drums from said first mobile tire building trolley to said second mobile tire building trolley.

5. The module of claim 3 further comprising:
a central transfer station located between said first workstations and second workstations, said central transfer station adapted to transfer each of said tire building drums from said second mobile tire building trolley to said cure station.

6. The module of claim 3 wherein said first mobile tire building trolley and said second mobile tire building trolley each simultaneously support a corresponding one of said tire building drums.

7. The module of claim 6 wherein said tire mold of said cure station supports a corresponding one of said tire building drums while said first mobile tire building trolley supports said corresponding one of said tire building drums and said second mobile tire building trolley supports said corresponding one of said tire building drums.

8. The module of claim 3 wherein said second mobile tire building trolley transports each of said tire building drums along said path in a first direction away from said cure station and in a second direction toward said curing station.

9. The module of claim 8 wherein at least one of said second workstations is configured to apply the corresponding at least another tire component when said second mobile tire building trolley transports each of said tire building drums along said path in said first direction.

10. The module of claim 9 wherein at least one of said second workstations is configured to apply the corresponding at least another tire component when said second mobile tire building trolley transports each of said tire building drums along said path in said second direction.

11. The module of claim 1 wherein said first mobile tire building trolley transports each of said tire building drums along said path in a first direction away from said cure station and in a second direction toward said curing station.

12. The module of claim 11 wherein at least one of said first workstations is configured to apply the corresponding at least one tire component to each of said tire building drums when said first mobile tire building trolley transports each of said tire building drums along said path in said first direction.

13. The module of claim 12 wherein at least another of said first workstations is configured to apply the corresponding at least one tire component to each of said tire building drums when said first mobile tire building trolley transports each of said tire building drums along said path in said second direction.

14. The module of claim 1 wherein said path is a linear path.

15. The module of claim 1 wherein said first mobile tire building trolley is configured to support each of said tire building drums while at least one of said first workstations applies a corresponding at least one of the tire components.

16. The module of claim 15 wherein said first mobile tire building trolley is configured to rotate each of said tire building drums, when supported, while the at least one of said first workstations applies the corresponding at least one of the tire components.

17. The module of claim 15 wherein said first mobile tire building trolley is configured to support each of said tire building drums while each of said first workstations applies the corresponding at least one of the tire components.

* * * * *